(No Model.)

M. E. DEMPSEY.
NUT LOCK.

No. 492,715. Patented Feb. 28, 1893.

Attest
C. W. Miles
T. Simmons

Inventor
Michael E. Dempsey
by Todd & Boyd Attys

UNITED STATES PATENT OFFICE.

MICHAEL E. DEMPSEY, OF CINCINNATI, OHIO.

NUT-LOCK.

SPECIFICATION forming part of Letters Patent No. 492,715, dated February 28, 1893.

Application filed June 6, 1892. Serial No. 435,733. (No model.)

*To all whom it may concern:*

Be it known that I, MICHAEL E. DEMPSEY, a citizen of the United States, residing at Cincinnati, in the county of Hamilton and State of Ohio, have invented certain new and useful Improvements in Nut-Locks, of which the following is a specification.

This invention has for its object to provide a new and improved nut lock and it consists in the features of construction hereinafter described and claimed, reference being made to the accompanying drawings, in which—

Figure 1:
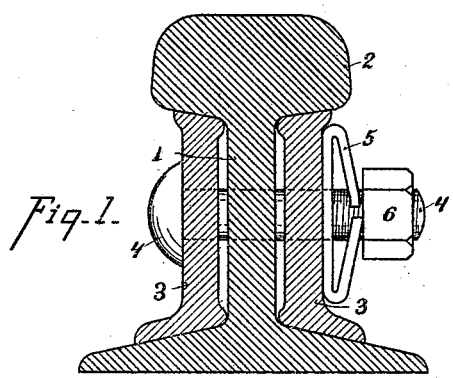
Figure 4:
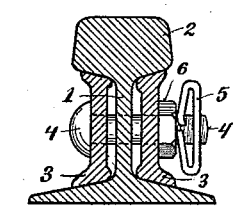
Figure 2:
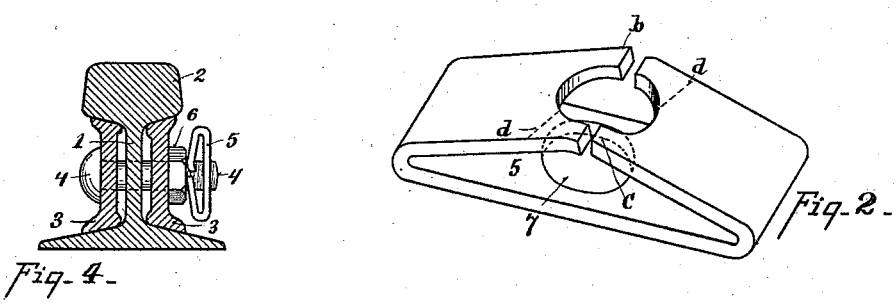
Figure 3:
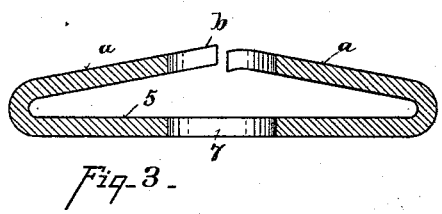

Figure 1 is a sectional elevation of a railway rail, fish plate and bolt, with my improvement applied thereto. Fig. 2 is a perspective view of the nut lock. Fig. 3 is a longitudinal vertical section of Fig. 2. Fig. 4 is a modification of Fig. 1.

1 represents the web of the railway rail; 2 the head; 3 the fish plates; 4 the bolt.

5 represents my improved nut lock; 6 the nut engaging the free ends of the nut lock which is interposed between it and the fish plate.

My improved nut lock consists of a washer plate base, the ends of which are turned up to form two spring limbs $a$; the free ends of these are a sufficient distance apart to allow of free play even when the spring limbs are compressed to their fullest extent.

7 represents a perforation in the base through which the bolt passes. The limbs $a$, $a$, are cut away forming a semi-circular recess so as to clear the bolt and yet approach each other so that the two opposite corners are nearly opposite each other. The spring ends tend to force the fish plate inwardly and take up lost motion, but a positive engagement is provided as follows: $b$ represents one of the free ends beveled or turned up so as to form a sharp edge or corner. The object of this latter form of construction is to furnish sharp engagement for the nut lock with the face of the nut. As the nut is turned down it slides over these edges compressing the spring limb inward and the resistance of the spring causes the edge to engage with the under face of the nut to prevent it from being turned backward.

It is very important to have a large amount of spring in the nut lock; because as the fish plates and bolts oxidize and the jar loosens the oxidation the spring takes up the lost motion thus occasioned. It expands to compensate for such loss; hence, my improvement not only prevents the nut from being readily turned backward under ordinary strain, but the spring compensates for lost motion caused by the wear of the parts. Another advantage is obtained by the nut lock when used for fish plates. It covers the elongated holes of the fish plate and does catch therein by the creeping of rail and fish plate.

The metal could be cut away as indicated by dotted lines $d$, and still accomplish the object of this invention; but the spring members are stronger when made in the form shown in Fig. 2. So, also, the lock nut could be applied on the outside of the nut in cases where it is not desired to take up lost motion. This is accomplished by screw threading the orifice 7 and using the device as a combined nut and nut lock, as shown in Fig. 4.

Having described my invention, what I claim is—

A nut lock, consisting of the washer base pierced with a bolt orifice 7 and having the ends turned up to form spring limbs $a$ extending upwardly and toward each other, said limbs having their free ends cut away to form semi-circular recesses to inclose yet clear the bolt and the opposite corners turned up to form the sharp edges $b$ to engage the face of the nut, substantially as described.

In testimony whereof I have hereunto set my hand.

MICHAEL E. DEMPSEY.

Witnesses:
T. SIMMONS,
C. W. MILES.